(12) United States Patent
Zhu et al.

(10) Patent No.: US 10,422,709 B2
(45) Date of Patent: Sep. 24, 2019

(54) METHOD OF ESTIMATING TENSION OF CHAIN OF SCRAPER CONVEYOR

(71) Applicant: CHINA UNIVERSITY OF MINING AND TECHNOLOGY, Xuzhou (CN)

(72) Inventors: Zhencai Zhu, Xuzhou (CN); Wei Li, Xuzhou (CN); Xing Zhang, Xuzhou (CN); Jiang Fan, Xuzhou (CN); Gongbo Zhou, Xuzhou (CN); Yuxing Peng, Xuzhou (CN); Guohua Cao, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 96 days.

(21) Appl. No.: 15/548,126

(22) PCT Filed: Dec. 2, 2016

(86) PCT No.: PCT/CN2016/108402
§ 371 (c)(1),
(2) Date: Aug. 2, 2017

(87) PCT Pub. No.: WO2017/152670
PCT Pub. Date: Sep. 14, 2017

(65) Prior Publication Data
US 2018/0120180 A1    May 3, 2018

(30) Foreign Application Priority Data

Mar. 7, 2016  (CN) .......................... 2016 1 0128280

(51) Int. Cl.
*G01L 5/10* (2006.01)
*G01L 5/04* (2006.01)

(52) U.S. Cl.
CPC ................ *G01L 5/101* (2013.01); *G01L 5/04* (2013.01)

(58) Field of Classification Search
CPC .................................. G01L 5/101; G01L 5/04
(Continued)

(56) References Cited

U.S. PATENT DOCUMENTS

| 4,566,339 A * | 1/1986 | Davidson ................ G01L 5/102 |
| | | 340/870.38 |
| 7,082,845 B2 * | 8/2006 | Simons ................ G01G 19/083 |
| | | 73/862.382 |

(Continued)

FOREIGN PATENT DOCUMENTS

| CN | 1661346 | 8/2005 |
| CN | 201322666 | 10/2009 |

(Continued)

*Primary Examiner* — Natalie Huls
*Assistant Examiner* — Monica S Young
(74) *Attorney, Agent, or Firm* — Treasure IP Group, LLC

(57) ABSTRACT

Disclosed is a method for estimating tension of a chain of a scraper conveyor, belonging to a method for estimating chain tension. The method comprises the following steps: embedding strain sensors in a plurality of scrapers of a scraper conveyor to measure the tension of weak coupling points between the scrapers and chains, converting acquired sensor signals into data signals through an A/D conversion unit, transmitting the data signals to a data control center using a wireless transmission module, further processing the tension data information of the weak coupling points through the data control center, establishing a chain tension distribution model, and determining an the estimated tension of the chain of the scraper conveyor. The method provided by the present invention is simple, efficient and practical, and the estimation of tension of the whole continuous moving chain is completed by the tension measurement at limited positions of the chain. The chain of the scraper conveyor is meshed with a sprocket and continuously moves in a middle trough and its tension also changes in real time along with the load; the strain sensors are arranged on the (Continued)

scrapers to measure the tension of the weak coupling points between the scrapers and the chains, and the estimation of tension of the whole chain is completed by tension measurement at limited positions on the chain.

1 Claim, 2 Drawing Sheets

(58) Field of Classification Search
USPC .......................................................... 73/828
See application file for complete search history.

(56) References Cited

U.S. PATENT DOCUMENTS

| | | | | |
|---|---|---|---|---|
| 8,191,703 | B2* | 6/2012 | Tokhtuev | B65G 43/02 198/810.04 |
| 8,636,140 | B2* | 1/2014 | Tout | B65G 23/44 198/814 |
| 2005/0075846 | A1* | 4/2005 | Kim | G01H 9/004 703/1 |
| 2007/0245837 | A1* | 10/2007 | Scott | G01L 5/101 73/862.627 |
| 2008/0214344 | A1* | 9/2008 | Lodge | G01L 5/047 474/207 |
| 2010/0270128 | A1* | 10/2010 | Hill | B65G 23/44 198/728 |
| 2011/0079491 | A1 | 4/2011 | Tokhtuev et al. | |
| 2013/0015043 | A1* | 1/2013 | Tout | B65G 23/44 198/810.04 |
| 2016/0231278 | A1* | 8/2016 | Goroshevskiy | G01N 27/82 |
| 2016/0304286 | A1* | 10/2016 | Pauli | G01L 1/00 |
| 2017/0003177 | A1* | 1/2017 | Cedilnik | G01K 11/32 |

FOREIGN PATENT DOCUMENTS

| | | |
|---|---|---|
| CN | 101692015 | 4/2010 |
| CN | 102183330 | 9/2011 |
| CN | 204568638 | 8/2015 |
| CN | 105784241 | 7/2016 |
| JP | 2008032425 | 2/2008 |

* cited by examiner

METHOD OF ESTIMATING TENSION OF CHAIN OF SCRAPER CONVEYOR

CROSS REFERENCE TO RELATED APPLICATION

This application is a national stage application of a PCT application PCT/CN2016/108402, Dec. 2, 2016, entitled "METHOD FOR ESTIMATING TENSION OF CHAIN OF SCRAPER CONVEYOR" which further takes priority from a Chinese application CN 201610128280.3, filed Mar. 27, 2016. The international application and Chinese priority application are incorporated herein by reference in their entireties.

BACKGROUND

Technical Field

The present invention relates to a method for estimating tension of a chain, and especially relates to a method for estimating tension of a chain of a scraper conveyor.

Related Art

The action of the scraper conveyor on a fully mechanized coal mining face includes sprocket chain drive and middle trough pushing and rolling; the chain of the scraper conveyor is subjected to the combined action of various loads such as tension, self gravity, coal load and frictional resistance in the work process. In addition, as one of the most easily failed parts of the scraper conveyor, the chain of the scraper conveyor is highly affected by the degree of straightness of the scraper conveyor and the degree of undulation of the ground to cause failures such as chain breakage, chain jumping and chain dropping.

The running environment of the scraper conveyor is harsh; the chain is meshed with a sprocket and continuously moves in a middle trough; the tension of the chain continuously varies under the effect of external factors, and too large or too small of a chain tension and uneven distribution of chain tension are the direct causes of chain failure.

SUMMARY OF THE INVENTION

The present invention is directed to a simple, efficient and practical method for estimating tension of a chain of a scraper conveyor to solve the failure problem caused by too large or too small chain tension and uneven distribution of chain tension as the tension of the chain varies under the effect of external factors.

The object of the present invention is achieved as follows: the method for estimating the tension of the chain comprises the following steps:

(1) according to the variation law of chain tension and load and chain speed, determining a coupling relationship between tension of points of the chain through correlation analysis, and establishing a weak coupling point set by using a contact point of the scraper and the chain as a weak coupling point;

(2) embedding strain sensors in a plurality of scrapers of a scraper conveyor, obtaining the tension of corresponding weak coupling point by measuring the force borne by the contact point between the scraper and the chain, using an interpolation method to describe the tension of the chain between the weak coupling points, establishing a chain tension distribution discrete model formed by the weak coupling points, and estimating tension distribution of the whole chain based on the tension of the weak coupling point of the chain measured in real time;

(3) calculating the relative movement of the scraper and the chain being affected by real-time load distribution and chain speed variation factors, further optimizing the results of estimation of real-time tension of the chain based on an adaptive Kalman filter, and predicting the chain tension through a data control center.

Strain sensors are arranged in transverse chain troughs and vertical chain troughs of the plurality of scrapers of the conveyor scraper, and the mounting positions of the strain sensors on the scrapers of the scraper conveyors do not change.

The surface of each of the plurality of scraper on the of scraper conveyor is provided with an equipment mounting groove and a data acquisition card, an A/D conversion module, a wireless transmission module and a power supply module arranged in the equipment mounting groove; the data signals of the strain sensors adopt a wireless transmission mode, the data volume is reduced by a data compression mode, and a transmission protocol is designed to shorten the transmission delay.

The method provided by the invention has the beneficial effects and advantages that: with the above-mentioned scheme, the chain of the scraper conveyor is meshed with a sprocket and continuously moves in a middle trough, and its tension also changes in real time with the load, strain sensors are arranged on the plurality of scrapers of the scraper conveyor to measure the tension of the weak coupling points between the scrapers and the chains, and the estimation of tension of the whole chain is completed by the tension measurement at limited positions of the chain.

The failure caused by too large and too small of chain tension and uneven distribution of chain tension as the tension of the chain varies under the effect of external factors is solved to achieve the object of the present invention.

In drawings: 1. Upper scraper of scraper conveyor; 2. Lower pressure plate of scraper conveyor; 3. Vertical chain; 4. Transverse chain; 5. Positioning hole; 6. Equipment mounting groove; 7. Lead slot; 8. Lead hole; 9. Transverse chain trough; 91. Upper scraper transverse chain SMT (Surface Mounted Technology) trough; 92. Lower pressure plate transverse chain SMT trough; 10. Vertical chain SMT trough; 101. Upper scraper vertical chain SMT trough; 102. Lower pressure plate vertical chain SMT trough; 11. Vertical chain nest; 12. Fixed lug boss; 13. Fixed groove.

DETAILED DESCRIPTION

A method for estimating tension of a chain of a scraper conveyor comprises the following steps:

(1) according to the variation law of chain tension and load and chain speed, determining the coupling relationship between tension of points of the chain through correlation analysis, and establishing a weak coupling point set by using a contact point of the scraper and the chain as a weak coupling point;

(2) embedding strain sensors in a plurality of scrapers on a scraper conveyor, obtaining the tension of the corresponding weak coupling point by measuring the force borne by the contact point between the scraper and the chain, using an interpolation method to describe the tension of the chain between the weak coupling points, establishing a chain tension distribution discrete model formed by the weak coupling points, and determining an estimated tension distribution of the whole chain based on the tension of the weak coupling point of the chain measured in real time;

(3) the relative movement of the scraper and the chain being affected by real-time load distribution and chain speed variation factors, further optimizing the results of estimation of real-time tension of the chain based on an adaptive Kalman filter, and predicting the chain tension through a data control center.

The strain sensors are arranged in transverse chain troughs and vertical chain troughs of the plurality of scrapers of the conveyor scraper, and the mounting positions of the strain sensors on the plurality of scrapers of the scraper conveyor are the same.

The surface of each of the plurality of scrapers of the scraper conveyor is provided with an equipment mounting groove and a data acquisition card, an A/D conversion module, a wireless transmission module and a power supply module that are arranged in the equipment mounting groove; and the data signals of the strain sensors adopt a wireless transmission mode, the data volume is reduced by a data compression mode, and a reliable transmission protocol is designed to shorten the transmission delay.

The present invention will be further explained below with reference to the accompanying drawings.

Embodiment 1

Figure 1:
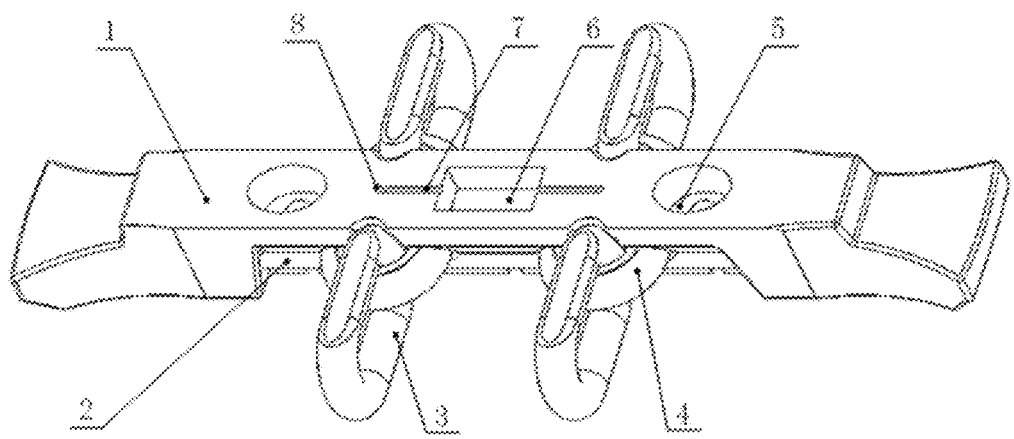
FIG. 1 is a mounting schematic diagram of a scraper assembly of a scraper conveyor according to the present invention.
Figure 2:
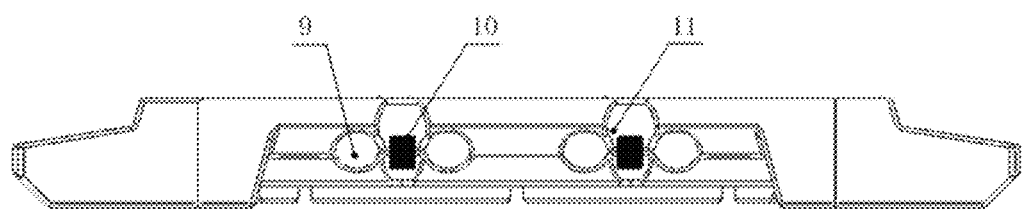
FIG. 2 is a mounting schematic diagram of a strain sensor according to the present invention.

As shown in FIGS. 1 and 2, a scraper of a scraper conveyor comprises an upper scraper of the scraper conveyor 1 and a lower pressure plate of the scraper conveyor 2, and the upper scraper and the lower pressure plate are connected into a whole piece through a fixed lug boss 12 and a fixed groove 13; a chain of the scraper conveyor comprises a vertical chain 3 and a transverse chain 4, the vertical chain 3 is in contact with the scraper through a vertical chain nest 11, and the transverse chain 4 is in contact with the scraper through a transverse chain trough 9; and the scraper of the scraper conveyor and the chain of the scraper conveyor are connected into a whole piece through positioning bolts based on positioning holes 5.

Figure 3:
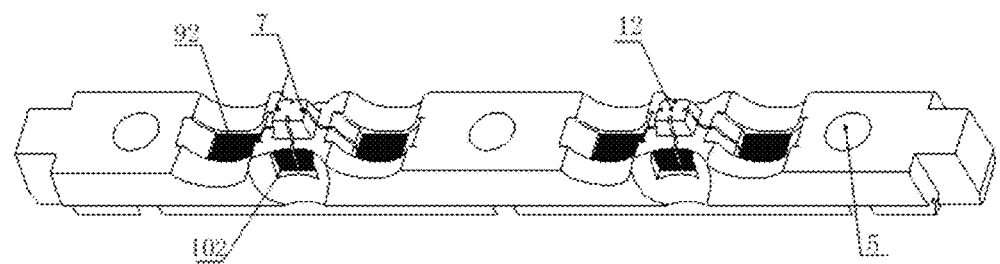
FIG. 3 is a mounting schematic diagram of a lower pressure plate strain sensor according to the present invention.
Figure 4:
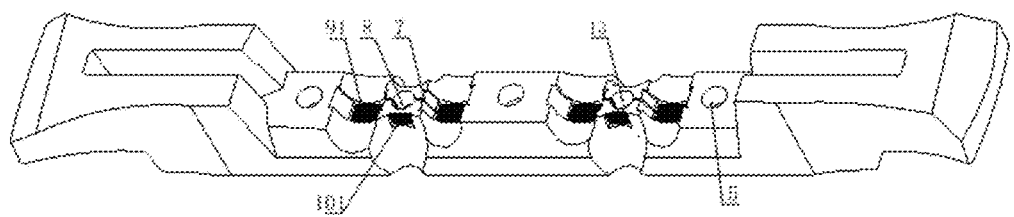
FIG. 4 is a mounting schematic diagram of an upper scraper strain sensor according to the present invention.
Figure 5:
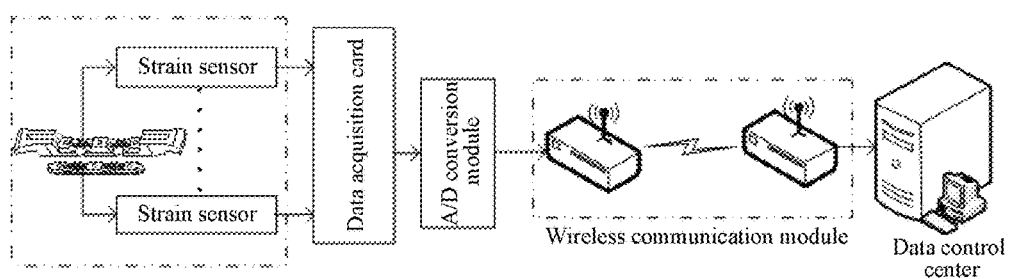
FIG. 5 is a schematic diagram of wireless transmission of data signals according to the present invention.

The strain sensors are arranged in a plurality of transverse chain SMT (Surface Mount Technology) troughs and vertical chain SMT troughs 10 of a scraper conveyor, and the mounting positions of the strain sensors on the plurality of scrapers of the scraper conveyor are the same; the transverse chain SMT trough comprises an upper scraper transverse chain SMT trough 91 and a lower pressure plate transverse chain SMT trough 92, the vertical chain SMT trough 10 is formed by an upper scraper vertical chain SMT trough 101 and a lower pressure plate vertical chain SMT trough 102 together, and lead slots 7 and a lead hole 8 are used for wiring of the strain sensors;

As shown in FIG. 3, the surface of each of the plurality of scrapers of the scraper conveyor is provided with an equipment mounting groove 6, and a data acquisition card, an A/D conversion module, a wireless transmission module and a power supply module are arranged in the equipment mounting groove; the data acquisition card is used for acquiring data signals of the strain sensors, and the A/D conversion module is used for converting the acquired sensor signals into digital signals; the wireless transmission module is used for transmitting wireless signals, and a wireless receiving module is used for receiving wireless signals and transmitting the data to a data control center so as to further process data information; the power supply module is used for supplying power to equipment; the signals are wirelessly transmitted, the data volume is reduced and the transmission delay is shortened by data compression and transmission protocol design.

The method for estimating the tension of the chain of the scraper conveyor comprises the following specific steps:

(1) according to the variation law of chain tension and load and chain speed, determining the coupling relationship between tension of points of the chain through correlation analysis, and establishing a weak coupling point set by using a contact point of the scraper and the chain as a weak coupling point;

(2) embedding strain sensors in a plurality of scrapers of a scraper conveyor, obtaining the tension of corresponding weak coupling point by measuring the force borne by the contact point between the scraper and the chain, using an interpolation method to describe the tension of the chain between the weak coupling points, establishing a chain tension distribution discrete model formed by the weak coupling points, and determining the estimated tension distribution of the whole chain based on the tension of the weak coupling point of the chain measured in real time;

(3) the relative movement between the scraper and the chain easily being affected by real-time load distribution and chain speed variation factors and so on, further optimizing the results of estimation of real-time tension of the chain based on an adaptive Kalman filter, and predicting the chain tension through the data control center.

What is claimed is:

1. A method for estimating tension of a chain of a scraper conveyor, comprising the following steps:
 (1) according to the variation law of chain tension and load and chain speed, determining the coupling relationship between tension of points of the chain through correlation analysis, and establishing a weak coupling point set by using a contact point of the scraper and the chain as a weak coupling point;
 (2) embedding strain sensors in a plurality of scrapers of a scraper conveyor, obtaining the tension of corresponding weak coupling point by measuring the force borne by the contact point between the scraper and the chain, using an interpolation method to describe the tension of the chain between the weak coupling points, establishing a chain tension distribution discrete model formed by the weak coupling points, and determining an estimated tension distribution of the whole chain based on the tension of the weak coupling point of the chain measured in real time; and
 (3) calculating a relative movement of the scraper and the chain by real-time load distribution and chain speed values, adjusting values for variation factors, and further optimizing the resulting values of real-time tension of the chain based on an adaptive Kalman filter, and (4) using the results of real-time tension for determining the chain tension through a data control center, wherein the strain sensors are arranged on each of the plurality of scrapers of the scraper conveyors, in a same surface mounted manner as follows in transverse chain troughs, including an upper scraper transverse chain surface mounted technology (SMT) trough (91) and a lower pressure plate transverse chain SMT trough (92), and wherein in the vertical chain troughs, includes both an upper scraper vertical chain SMT trough (101) and a lower pressure plate vertical chain SMT trough (102), of the plurality of scrapers of the conveyor scraper, and the mounting positions of the strain sensors on the plurality of scrapers of the scraper conveyors are the same; and within the surface of each of the plurality of scrapers of the scraper conveyor is provided with an equipment mounting groove, and containing a data acquisition card, an A/D conversion module, a power supply module, and a wireless transmission module, where the data signals of the strain sensors are transmitted with a wireless transmission mode, using a compressed data volume on the data signals.

* * * * *